United States Patent [19]

Roberts

[11] Patent Number: 4,738,582
[45] Date of Patent: Apr. 19, 1988

[54] TANK CARRIER AND MANIPULATOR

[75] Inventor: John E. Roberts, Waite Hills, Ohio

[73] Assignee: E Manufacturing Company Inc., Mentor, Ohio

[21] Appl. No.: 940,782

[22] Filed: Dec. 11, 1986

[51] Int. Cl.$^4$ .............................................. B60P 1/04
[52] U.S. Cl. ...................................... 414/546; 414/469; 414/462; 248/142
[58] Field of Search .............................. 414/419–421, 414/462, 607, 910, 772, 546, 465, 684, 732, 735, 738; 280/47.34; 248/137, 141, 142, 291; 901/29

[56] References Cited

U.S. PATENT DOCUMENTS

| | | | |
|---|---|---|---|
| 171,451 | 12/1875 | Viall et al. | 414/685 |
| 2,477,294 | 7/1949 | Fuller | 414/448 |
| 2,720,993 | 10/1955 | Lull | 414/629 |
| 2,752,056 | 6/1956 | Lull | 414/629 |
| 2,780,377 | 2/1957 | Glenn, Jr. et al. | 414/607 X |
| 3,086,664 | 4/1963 | Gribble | 414/745 |
| 3,471,046 | 10/1969 | Hess | 414/469 |
| 3,522,893 | 8/1970 | Yokich | 414/420 |
| 3,858,735 | 1/1975 | Zrostuk | 414/735 X |
| 4,021,070 | 5/1977 | Shea | 414/466 X |
| 4,205,937 | 6/1980 | Fawley | 414/457 |
| 4,536,123 | 8/1985 | Snyder | 414/448 |
| 4,597,498 | 7/1986 | Spinosa et al. | 212/189 |

FOREIGN PATENT DOCUMENTS 1053410  3/1959  Fed. Rep. of Germany ...... 414/421

Primary Examiner—Robert J. Spar
Assistant Examiner—Vien Nguyen
Attorney, Agent, or Firm—Irvin L. Groh; Alfred L. Patmore, Jr.

[57] ABSTRACT

A tank carrier and manipulator primarily for handling cylindrical tanks of liquid such as liquified gas or chemicals and inverting them for use. Normally mounted on a wheeled vehicle for transport and liquid dispensing use, the tank is strapped to a support member while standing in a vertical position on the ground. The tank can then be tilted to a desired angle clearing structure on the vehicle and rotated approximately 180° to present the top of the tank in a generally downward position for dispensing its contents in liquid form. The vehicle can contain auxiliary equipment such as a pressure vessel for heating the liquid and delivering it as a gas.

11 Claims, 3 Drawing Sheets

TANK CARRIER AND MANIPULATOR

BACKGROUND OF THE INVENTION

1. Field Of The Invention

This invention relates to a tank carrier and manipulator, and, more particularly, to a device for transporting and handling cylindrical tanks of liquified gas and inverting them for dispensing the tank contents as a liquid.

2. Description Of The Related Art

There are a wide variety of tank carriers or trucks for transporting cylinders of compressed gas for use. Typically, the carrier has a platform at ground or floor level onto which the tank is placed. A two-wheeled structure having wheels on either side of the tank location permits tilting of the carrier backwards toward the user by an upwardly projecting handle and for wheeling the tank to a point of use.

Some cylinder carriers provide means for engaging the cylinder as it stands on the ground without the need for manhandling the cylinder onto a platform. For example, if the cylinder is fitted with a hook receiving structure at its top end, the carrier may have hook to engage the structure and then pivot the tank against an upright member without the use of a lower support platform. Another type of known carrier provides, in addition to a two-wheel support, support legs which extend forwardly of the wheels permitting the cart to be moved against the cylinder as it stands on the ground. In this type of structure the cylinder is strapped to the support structure without the use of a supporting platform. Aside from a straight transport function, these carts do not provide other tank manipulating functions.

Where the tanks need to be elevated to a use position such as in the case of tanks of oxygen and acetylene for welding purposes, a jack raising mechanism has been build into the transport cart to permit the tank to be elevated to the platform height and then slid from the cart onto the platform. None of these mechanisms provide a means for inverting the tank so that the contents can be dispensed as a liquid. In the case of chemicals such as acids which are contained in carboys, a stationary tilting mechanism is commonly employed to tip the carboy toward the user to dispense the liquid. Here the carboy still has to be manhandled in placing it in the tipping carrier and other means must be used to transport it to the stationary carrier site.

It is, therefore, a primary objective of this invention to provide a tank carrier and manipulator which can lift a tank standing on the ground to a transport position and for inverting the tank to dispense its contents as a liquid without the need for the user physically lifting or otherwise manually manipulating the tank.

It is another object of this invention to provide apparatus for initially loading a tank in its vertical ground engaging position to a tilted position and locking it in such position so that it may be rotated to an inverted use position and locked in such position.

It is a further object of this invention to provide a wheeled vehicle with a tank carrier and manipulator which also can accomodate an auxiliary pressure vessel for heating the liquified gas dispensed from the tank in its inverted position to deliver the tank contents as a gas from the pressure vessel.

SUMMARY OF THE INVENTION

The foregoing objectives and other advantages of this invention have been realized in a tank carrier and manipulator having a pair of spaced upright frame members. A swivel block is pivotally mounted between the frame members on a horizontal tilt axis. A tank engaging support member, in the form of an elongated channel, is rotatably attached to the swivel block about a swivel axis which is perpendicular to the tilt axis. With this construction, a tank can be engaged while in a ground position and then tilted from the vertical by pivoting the support member and attached swivel block to a tilt angle between 0° and 90° from the vertical. In this position it clears the upright frame members and the tank can be rotated approximately 180° by movement of the support member about the swivel axis to present the top of the tank pointed generally downward at the tilt angle.

A lock is provided for maintaining the swivel block stationary about its pivot axis in the vertical tank engaging position and in the alternate tilted position. Another lock is utilized to maintain the tank carrier in a first position and in a second position in which it has been rotated 180°. Both of these locks take the form of shot pin and aperture type device which locks the member against rotation about the respective tilt and swivel axes.

A stop bar is preferably attached between the spaced upright frame members to limit the tilting of the tank engaging support member past a vertical postion in one direction by the engagement of the stop bar with the swivel block.

The tank carrier and manipulator is mounted on a wheeled cart of the type having four wheels and a horizontally disposed platform above the wheel axis. The platform has a tank engaging recess at one end, and the upright frame members are located adjacent the recess with the tank engaging support member extending above the recess. This permits moving the cart into a position with the tank standing at the floor level so that it may be engaged by the tank engaging support member.

Metal strap members attached at spaced positions to the tank engaging support member provide a means for securing the tank tightly against the support member. Typically, metal straps having quick-connect-disconnect means at their ends are used along with a resilient liner member to secure the tank against the support member.

A heated pressure vessel can be located on the platform and conduit means provided for connecting the tank to the pressure vessel for delivery of liquified gas from the tank to the pressure vessel for gassification and delivery to a point of use.

A typical use of the manipulator with the heated pressure vessel is to provide a means for charging high voltage switching or circuit breaker tanks with an insulating gas which minimizes high voltage arcing in use. Typically such a gas is sulfur hexafluoride, $SF_6$, which because of its physical properties cannot be drawn off in gaseous form from a upright tank containing the liquified gas at a commercially acceptable rate. With the present apparatus, the sulfur hexafluoride can be drawn off at a reasonable use rate in liquid form and heated to the proper temperature and pressure for delivery to the container to be charged. Another advantage of this system which directly connects the inverted tank to the pressure vessel, is that substantially all of the gas can be withdrawn from the cylinder leaving only a residual without contaminating the tank with an inflow of air thereby avoiding expensive cylinder reconditioning.

DRAWING

The preferred embodiments of the invention are illustrated in the drawing in which:

FIG. 1 shows the tank in an upright vertical loading position and, in phantom, in an intermediate tilted position, and, also in phantom, in a tilted and rotated position where it is shown connected to the pressure vessel for use;

DETAILED DESCRIPTION OF PRESENTLY PREFERRED EMBODIMENT

Figure 1:
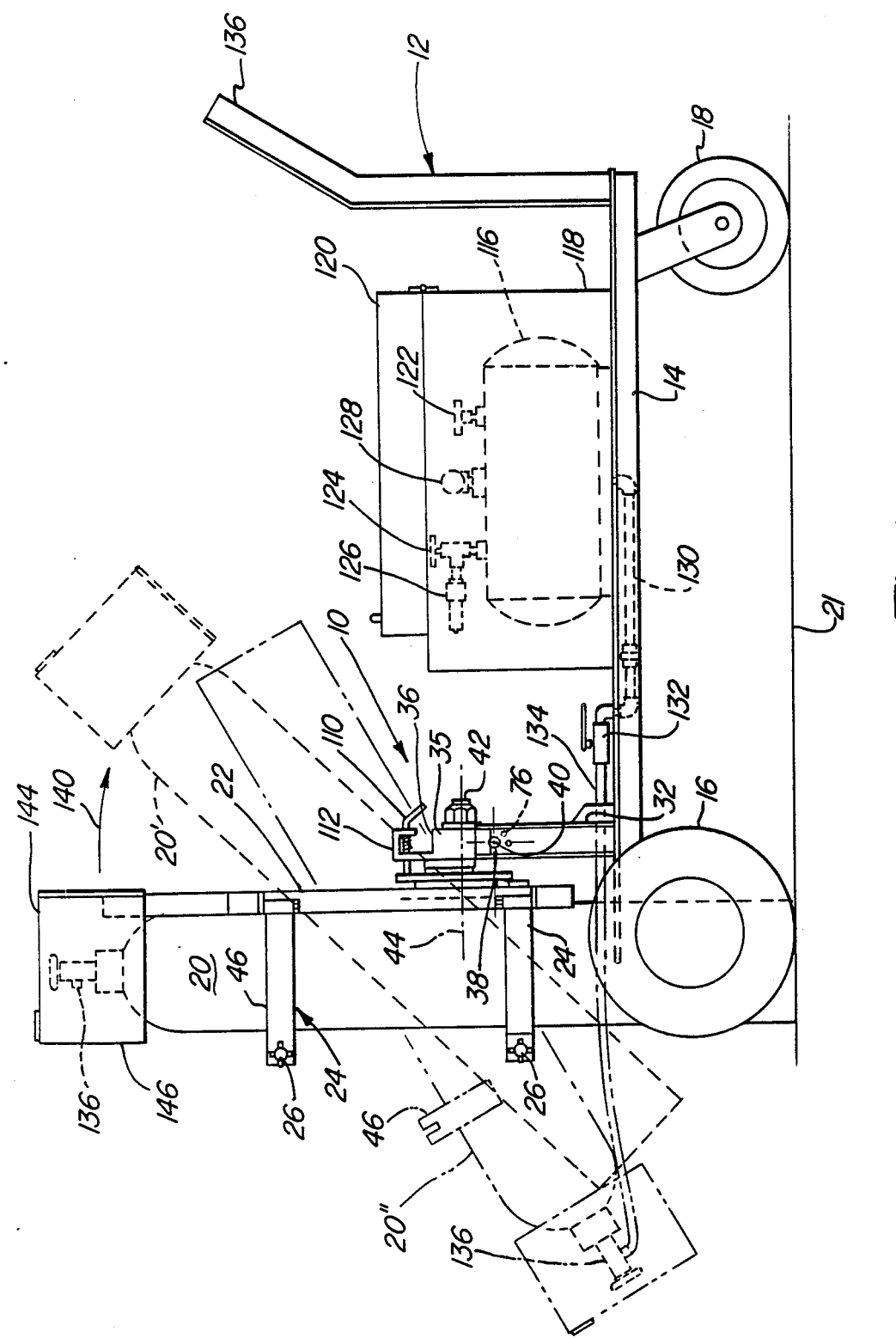
FIG. 1 is an elevational view showing the carrier and manipulator of this invention mounted on a four-wheeled cart with a tank engaged and connected to a pressure vessel.

As viewed in FIG. 1, tank carrier and manipulator 10 is shown mounted on mobile cart 12 having a substantially horizontal support platform 14 with a pair of front wheels 16 and rear wheels 18. Cylindrical pressure tank 20 is shown in its upright or vertical loading position standing directly on the ground 21 between the spaced front wheels 16, also see FIG. 2.

The manipulator 10 has a tank engaging support member in the form of channel 22 against which tank 20 is held by strap fastening members 24 having quick connect-disconnect toggle locks 26.

Figure 2:
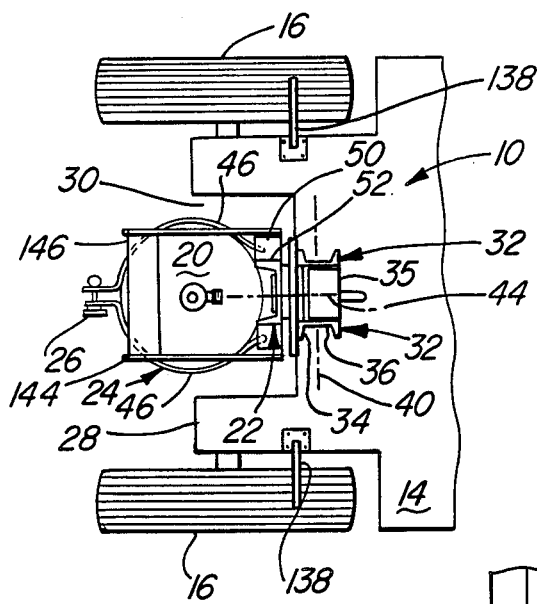
FIG. 2 is a partial plan view showing the tank in in its loading position in contact with the channel tank engaging support member and with a quick connect-disconnect strap member holding the tank firmly against the channel.

The front end of horizontal platform 14 is bifurcated as shown at 28 in FIG. 2 providing a tank loading recess area 30 which permits the cart 12 to be manuevered into position with the support member 22 in contact with the stationary vertically standing tank 20.

A pair of vertical frame members 32 in the form of channels are mounted directly on platform 14 with one of their legs 34 at the edge of recess 30 and their connecting webs 36 facing each other. Swivel block 35 is pivotally mounted on tilt shaft 38 pivoting about axis 40 as more clearly shown in FIG. 3.

Tank engaging support channel 22 is rotatably mounted on swivel shaft 42 for rotation about swivel axis 44.

Figure 3:
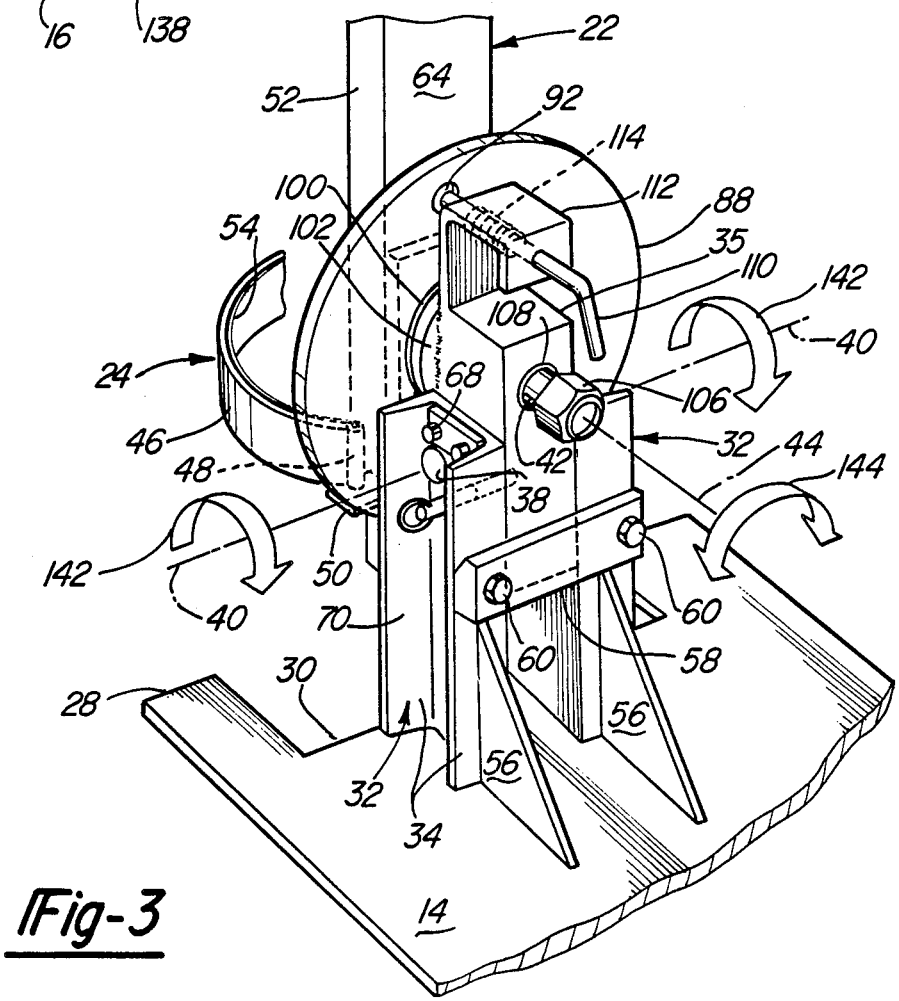
FIG. 3 is a perspective view of the carrier and manipulator of this invention showing the relative positions of the tilt axis and the swivel axis, and the means for locking the swivel block and support member is preselected positions.

As shown more clearly in FIGS. 2 and 3, the strap members 24 are constructed with two metal straps 46 which are pivotally mounted at one of their ends by pin and bushing 48 mounted on support platforms 50 attached to the outside of channel legs 52 of tank engaging support channel 22. Each strap 46 is lined with a strip 54 of resilient material such as rubber.

Figure 4:
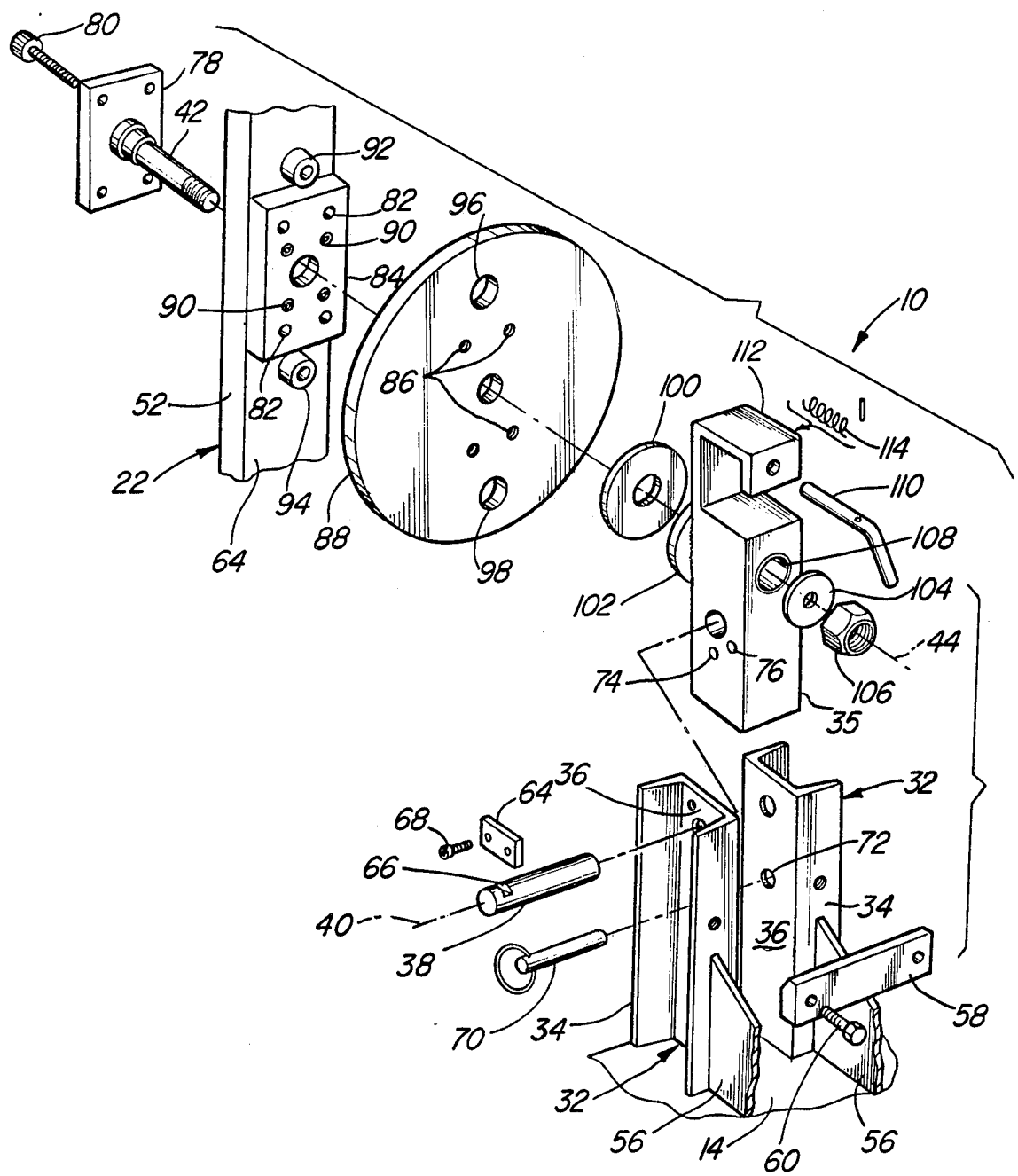
FIG. 4 is a view similar to FIG. 3 in exploded perspective form showing the arrangement and inner-connection of the elements of this invention.

The elements and working connection of the tank carrier and manipulator 10 can more clearly be seen in assembled form in FIG. 3 and in an exploded view in FIG. 4. Upright channel members 32 have reinforcing gusset plates 56 welded to panel legs 34 opposite the channel leg adjacent recess opening 30. Plates 56 are welded to platform 14. Stop bar 58 is also mounted to channel legs 34 by cap screws 60. Tilt shaft 38 is mounted between channel web faces 36 and is retained in position by shaft keeper bar 64 which engages slot 66 adjacent the end of shaft 38. Keeper bar 64 is fastened to a web face 36 with an allen head machine screws 68. Swivel block 35 is rotatably mounted on tilt shaft 38 between the vertical channel frame members 32. Keeper pin 70 acts as a lock to retain swivel block 35 in a fixed position on tilt shaft 38 by passing through aligned apertures 72 in the web faces 36 of frame members 32 while passing through one of the two apertures 72 and 74 in swivel block 35. When keeper pin passes through aperture 74, of the swivel block 35, the block is maintained in a vertical position. When it passes through aperture 76, it retains the swivel block in a tilted position, preferably at 60° to the vertical.

Swivel shaft 42 has mounting plate 78 attached at one end for stationary mounting to the tank engaging support member 22 by the use of machine screws 80 which pass through the mounting plate 78, web 64 of tank support channel 22, holes 82 in channel mounting plate 84, and into threaded holes 86 in shot pin retention disk 88. Channel mounting plate 84 is attached to channel web face 64 by cap screws 90 recessed within the plate. In some instances, the mounting plate can be eliminated or used alternatively to the shot pin retention plate 88. Swivel axis locking bosses 92 and 94 extending outwardly from channel face 64 pass through mounting holes 96 and 98 respectively in shot pin retention disk 88 as it is mounted to channel 22. Swivel shaft 42 passes through channel web 64, mounting plate 84 nylon friction disk 100 back-up disk 102 through swivel block 35 and flat washer 104 to be retained by lock nut 106. Suitable bushings, as well known in the art, may be used in supporting tilt shaft 38 and swivel shaft 42 as is typically shown by bearing 108 pressed in swivel block 35. Likewise, suitable bearings, (not shown) may be pressed into locking bosses 92 and 94 and locking apertures 74 and 76 to receive shot pin 110 and keeper pin 70, respectively.

Shot-pin 110 is retained in the L-shaped extension 112 of swivel block 35 with a coacting spring 114 to serve as a swivel axis lock by engagement with either aperture boss 92 or 94. Shot pin retention disk 88 retains the pin 110 in a disengaged position as the tank support 22 and swivel shaft 42 is rotated from an upright locked position utilizing boss 92 to a downwardly directed position where shot pin 110 engages the aperture in locking boss 94.

Referring back to FIG. 1, heated pressure vessel 116 is shown mounted on cart platform 14 surrounded by protective shroud or cabinet 118 having hinged lid 120. Suitably attached to pressure vessel 116 is temperature gauge 122, pressure gauge 124, pressure relief valve 126, and outlet delivery pipe 128 which would have an outlet valve (not shown). Also connected to pressure vessel 116 is inlet piping 130 having an inlet valve 132 and a flexible conduit 134 which connects to the tank 20 of liquified gas being supported. Flexible conduit 134 is of such a length and is arranged so as to be connected to the tank valve 136 when the tank is in its upright position. Such a showing has been eliminated for clarity purposes and the connection is only shown with the tank in its delivery position 20''.

In operation, the cart 12 is manuevered into position by the use of handle 136 so that the liquified gas cylinder 20 to be used is positioned in platform recess 30; see FIGS. 1 and 2. Toggle tire locks 138 are moved to engage front tires 16 to lock the cart in a stationary position for loading. Tank cylinder 20 standing at ground or floor level 21 abuts against the ends of legs 52 of channel support member 22. Strap members 24 are engaged around the tank 20 and locked in place with the quick connect-disconnect toggle clamps 26. Keeper pin 70 is pulled from the vertical frame members 32 allowing the swivel block to pivot about tilt axis 40 on tilt shaft 38. Tilt shaft 38 is so located on vertical frame members 32 relative to the size and weight of cylinder 20, that little effort is needed to tilt the tank backward or counterclockwise in a direction of the arrow 140 as shown in FIG. 1 or arrows 142 as shown in FIG. 3. Pivoting in the opposite direction is prevented by the engagement of swivel block 35 with stop bar 58. When the tank has been pivoted approximately 60° to the vertical as shown by tank position 20" in FIG. 1, the tank will be in position to clear the tires and frame member to permit rotation. The 20' position of tank 20 is intermediate to its final location at 60° shown at 20". When the final tilt angle position has been reached, keeper pin 70 can be reinstalled through aligned holes 72 in the upright members 34 engaging aperture 76 in swivel block 35 firmly locking the block against rotation on tilt axis 40. Shot-pin 110 can then be pulled back against the action of spring 114 to move the pin from the aperture in locking boss 92, and the tank may be rotated in either direction as shown by arrow 144 in FIG. 3, about swivel axis 44 on swivel shaft 42. Rotation of 180° positions the tank with its top facing downwardly in the position shown at 20" in FIG. 1. In this position, it is also at the optimum use position for delivery of liquified gas through flexible conduit 134, valve 132 and piping 130 to pressure tank 116. The bottom of tank 20 is at a higher level than the bottom of pressure vessel 116 in this 20" position. Swivel axis 44 or swivel shaft 42 is also located on swivel block 35 at a optimum position for the weight and size of the tank to be handled so that at minimum of effort is necessary to rotate the tank 180° from the tilted upright position approximately as shown at 20' to the inverted position shown at 20". During rotation of the tank by manual pushing of the tank engaging support member 22, the locking engagement end of shot-pin 112 rides on shot-pin retention disk 88 until it engages the aperture in final inverted position boss 94. Tank support shroud 144 is provided at the end of tank 20 engaging support member 22 to provide protection for the valve end of the tank and to support the tank should the quick connect-disconnect toggle members become disconnected or the strap members 24 fail to hold the tank 20 firmly against the support member 22. Tank shroud 144 has an open end at 146 to permit tank engagement by support member 22 in the initial vertical loading position of the tank 20 on ground 21.

It is evident from the foregoing description of the carrier and manipulator and its operation that it can be used for handling tanks of various configurations and carrying different liquid substances which it is desired to dispense in a liquid pouring position. The preferred angle of 60° has been dictated by the particular frame structure and cylindrical tanks of sulphur hexafluoride which are being utilized in the preferred embodiment as described above. Other angles may be optimum for a particular tank size or substance being dispensed.

The embodiments of the invention in which an exclusive property or privilege is claimed are defined as follows:

1. A tank carrier and manipulator comprising, in combination:
    a pair of spaced upright frame members;
    a swivel block pivotally mounted between said frame members on a horizontal tilt axis;
    a tank engaging support member rotatably attached to said swivel block about a swivel axis perpendicular to said tilt axis; and
    means for locking said swivel block with said tank engaging support member in a vertical position and in a tilted position at a tilt angle between 0° and 90° from the vertical, said locking means including a keeper pin which passes through aligned apertures in said upright frame members and a first aperture in said swivel block when said tank engaging support member is in a vertical position, and said keeper pin passes through said aligned apertures in said upright frame members and a second aperture in said swivel block when said tank engaging support member has been pivoted to said tilt angle;
    whereby a tank can be engaged by said tank engaging support member in a vertical position, tilted at a tilt angle between 0° and 90° from the vertical and rotated approximately 180° about said swivel axis to present the top of said tank pointed generally downward at said tilt angle.

2. A tank carrier and manipulator of claim 1 wherein the second aperture in said swivel block is located to lock said tank engaging support member at an angle of approximately 60° to the vertical.

3. The tank carrier and manipulator of claim 1 further including a stop bar attached between said spaced upright frame members which limits tilting of said tank engaging support member past a vertical position in one direction by engagement of said stop bar with said swivel block.

4. The tank carrier and manipulator of claim 1 further including spaced cylinder straps attached to said tank engaging support member for securing a tank to said support member.

5. The tank carrier and manipulator of claim 4 wherein each support strap includes a pair of metal straps pivotally connected to said support member at one of their ends and having complementary quick-connect-disconnect means at their other ends to hold a tank firmly against said tank engaging support member when said metal straps are held in a connected condition.

6. The tank carrier and manipulator of claim 5 wherein each metal strap has a resilient lining on one of its faces for engaging said tank to firmly hold the tank against said tank engaging support member.

7. The tank carrier and manipulator of claim 1 further including a wheeled cart having a substantially horizontally disposed platform with a tank loading recess at one end, and wherein said upright frame members are located adjacent said recess and said tank engaging support member extends above said recess; whereby said cart can be maneuvered to position a tank standing at floor level in said tank loading recess for engagement by said tank engaging support member, said pivot block can be pivoted to said tilt angle, and wherein the tank and support member clears said platform for rotation of said tank and support member about said swivel axis.

8. The tank carrier and manipulator of claim 1 for use in a gas charging system employing a tank of liquified gas further including:
    a heated pressure vessel conduit means for connecting a tank of liquified gas engaged by said support member to said pressure vessel; and a delivery pipe for delivering gas from said pressure vessel to a point of use;

whereby liquified gas can be delivered from said tank to said heated pressure vessel and gassified by heat applied therein for delivery as a gas.

9. A tank carrier and manipulator comprising, in combination:

a pair of spaced upright frame members;

a swivel block pivotally mounted between said frame members on a horizontal tilt shaft;

a tank engaging support member rotatably attached to the swivel block on a swivel shaft perpendicular to said tilt shaft;

means for locking said swivel block on said tilt shaft by locking said swivel block to said upright frame members with said tank engaging support member in a vertical position and in a pivoted position at a tilt angle; and means for locking said tank engaging support member on said swivel by locking said swivel block to said support member holding a tank in an upright position with its top facing in a generally upward direction and in an inverted position approximately 180° from said upright position holding the tank with its top facing in a generally downward direction;

whereby a tank can be engaged by said tank engaging support member in a vertical position with said swivel block locked on said tilt shaft, said means for locking said swivel block on said tilt shaft released, the support member tilted at a tilt angle between 0° and 90° from the vertical and said swivel block locked on said tilt shaft at said tilt angel; said means for locking said tank engaging support members on said swivel shaft can be released and said support member rotated approximately 180° about said swivel shaft presenting the top of said tank in a generally downward direction at said tilt angle, and said support member can be locked on said swivel shaft in this rotated position.

10. A tank carrier and manipulator comprising, in combination:

a wheeled cart having a substantially horizontally disposed platform with a tank loading recess at one end;

a pair of spaced upright frame members extending upwardly from said platform located adjacent said recess;

a horizontally disposed tilt shaft;

a swivel block pivotally mounted between said frame members on said tilt shaft;

a swivel shaft rotatably mounted in said swivel block on an axis 90° from said tilt shaft; and a tank engaging support member mounted on said swivel shaft for rotation relative to said swivel block, said support member including a channel member positioned so that the channel legs thereof contact the tank being supported thereby, said channel member extending above said recess, and support member further including spaced strap members arranged to embrace the tank and hold it against said channel member and a shroud member attached to one end of said channel member arranged to support the tank in an inverted position should said strap members fail to restrain movement of said tank relative to said channel member;

whereby said cart can be positioned with a tank standing upright at ground level in said loading recess, for engagement by said tank engaging support member, said tank can be tilted at an angle of 0° to 90° from the vertical by pivoting said swivel block on said tilt shaft allowing the tank and support member to clear cart obstructions, and said tank can be inverted with its top pointing generally downward by rotating said support member approximately 180° on said swivel shaft.

11. A tank carrier and manipulator comprising, in combination:

a pair of spaced upright frame members;

a swivel block pivotally mounted between said frame members on a horizontal tilt axis;

a tank engaging support member rotatably attached to said swivel block about a swivel axis perpendicular to said tilt axis; and means for locking said tank engaging support member holding a tank in a first position with its top facing in a generally upward direction and in a second position displaced approximately 180° from said first position holding the tank with its top facing in a generally downward direction, said locking means including a spring loaded plunger mounted on said swivel block which engages a first aperture on said tank engaging support member holding the tank in said first position, and said plunger engages a second aperture on said tank engaging support member holding the tank in said second position;

whereby a tank can be engaged by said tank engaging support member in a vertical position tilted at a tilt angle between 0° and 90° from the vertical and rotated approximately 180° about said swivel axis to present the top of said tank pointed generally downward at said tilt angle.

* * * * *